Dec. 15, 1959  J. W. ENNIS  2,917,089

MITERING AND KERFING MACHINE

Filed June 12, 1959  2 Sheets-Sheet 1

INVENTOR.
JAMES W. ENNIS

BY John R. Walker, III
Attorney

Dec. 15, 1959  J. W. ENNIS  2,917,089
MITERING AND KERFING MACHINE
Filed June 12, 1959  2 Sheets-Sheet 2
FIG. 3
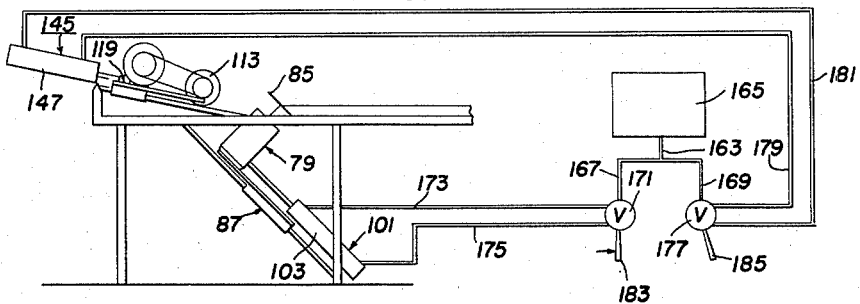
FIG. 4
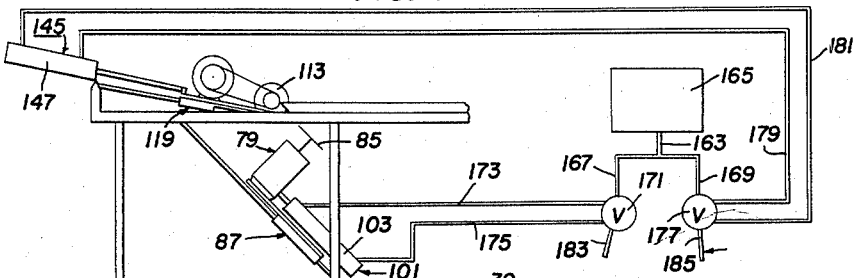
FIG. 5
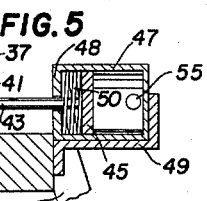
FIG. 8
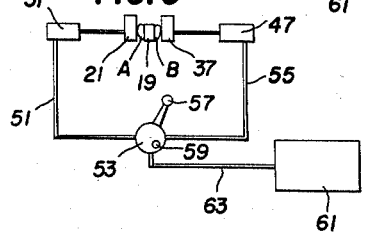
FIG. 9
FIG. 6
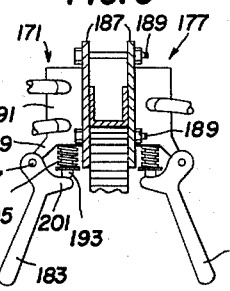
FIG. 7
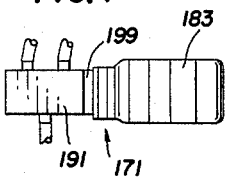
INVENTOR.
JAMES W. ENNIS
BY John R. Walker, III
Attorney

United States Patent Office 2,917,089
Patented Dec. 15, 1959

2,917,089

MITERING AND KERFING MACHINE

James W. Ennis, Memphis, Tenn., assignor to Cole Manufacturing Company, Memphis, Tenn., a corporation of Tennessee Application June 12, 1959, Serial No. 819,878

5 Claims. (Cl. 144—3)

This invention relates to a machine adapted to cut frame members or the like for mitered corner joints and to kerf the members for a spline fastening at the joint.

This device is particularly adapted to be used in the forming of door casings although it will be understood that it may be applied to the forming of other types of frame members without departing from the spirit and scope of the present invention. The present general practice in the door casing industry is to first make one right-hand miter cut and then one left-hand miter cut on two pieces of casings by means of a radial arm saw. After the mitering is done as above described, the pieces are transported to a second machine for the kerfing operation, which is a right- and left-hand operation, making a total of four different processes involved.

One of the general objects of the present invention is to provide an improved cutting apparatus overcoming the disadvantages of having four different processes as above mentioned by providing a machine in which the same work is done in one simple operation.

A further object is to provide such a machine comprising means provided for clamping two work pieces in side-by-side reversed relationship, means for simultaneously cutting said work pieces at a 45-degree angle to form a right- and left-hand miter cut, and means for simultaneously kerfing said pieces at a right angle to said miter cuts.

A further object is to provide in such a machine, knee actuated switch means for controlling the mitering and kerfing means so that a single operator can operate the machine with safety and with speed.

A further object is to provide a novel machine arrangement so that an operator can quickly and easily perform the mitering and kerfing operations with a production capacity greatly exceeding that heretofore attainable.

A further object is generally to improve the design and construction of mitering and kerfing machines.

The means by which the foregoing and other objects of the present invention are accomplished and the manner of their accomplishment will be readily understood from the following specification upon reference to the accompanying drawings, in which:

Fig. 3 is a diagrammatic view of the machine illustrating the disposition of the machine parts during the mitering phase of the machine operation.

Fig. 4 is a similar diagrammatic view illustrating the disposition of the machine parts during the kerfing phase of the machine operation.

Fig. 5 is a fragmentary sectional view on an enlarged scale and taken as on the line V—V of Fig. 2.

Fig. 6 is a fragmentary sectional view on an enlarged scale taken as on the line VI—VI of Fig. 1, showing the knee actuated valves.

Fig. 7 is a side elevational view of one of the valves.

Fig. 8 is a diagrammatic view showing the clamping means of the present invention in an open position.

Fig. 9 is a diagrammatic view of the same showing the clamping position thereof.

Figure 1:
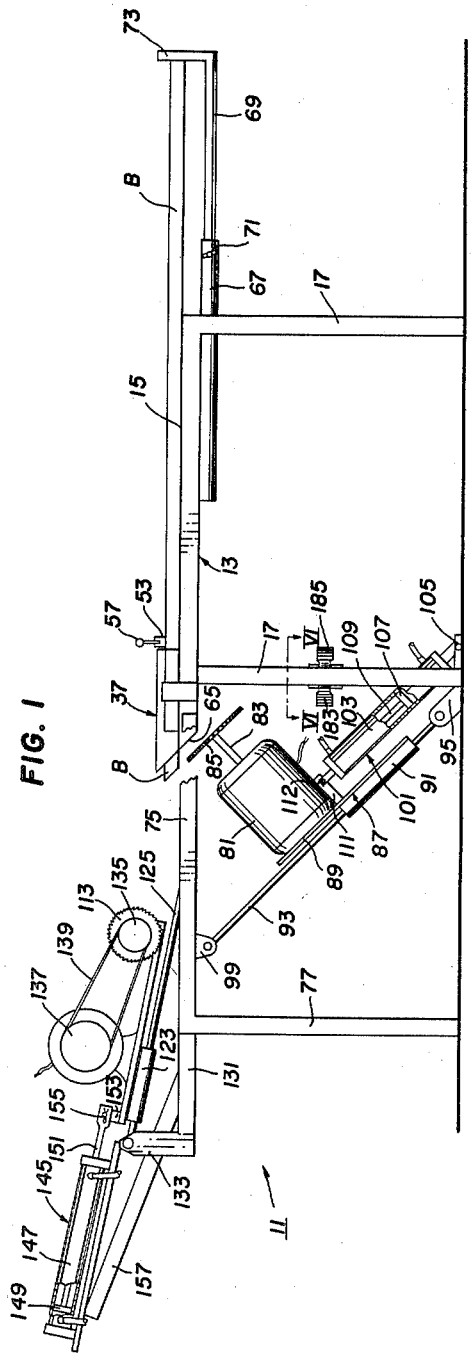
Fig. 1 is a side elevational view of the machine of the present invention with parts broken away and removed for purposes of illustration.

Referring now to the drawings in which the various parts are indicated by numerals, the machine of the present invention, indicated in general as at 11, includes a feed table 13 comprising a substantially horizontal flat upper surface 15 and a plurality of legs 17. An elongated rail 19 is fixedly mounted on feed table 13 adjacent the middle thereof and extends longitudinally thereof.

A movably mounted clamping shoe 21 is disposed on one side of rail 19 in spaced parallel relationship thereto. Clamping shoe 21 includes a wooden block 23 anchored by suitable means to a backing member 25 (Figure 5). A rod 27 is fixedly attached adjacent one end to backing member 25 and extends outwardly therefrom. Adjacent the outer end of rod 27 is fixedly attached a piston 29 slidably mounted in a cylinder 31 that is fixedly mounted from table 13 by suitable means, as a bracket 33. Rod 27 extends through an aperture in the end 35 of cylinder 31, and a compression spring 36 is disposed between end 35 and piston 29 to urge the piston away from end 35.

Another clamping shoe 37, similar in construction to clamping shoe 21, is provided on the other side of rail 19 in spaced parallel relationship thereto and its related parts are constructed in a manner similar to those of the related parts of clamping shoe 21. Thus, clamping shoe 37 and its related parts include a block 39, a backing member 41, a rod 43, a piston 45, a cylinder 47 having an end 48, a bracket 49, and a spring 50.

Figure 2:
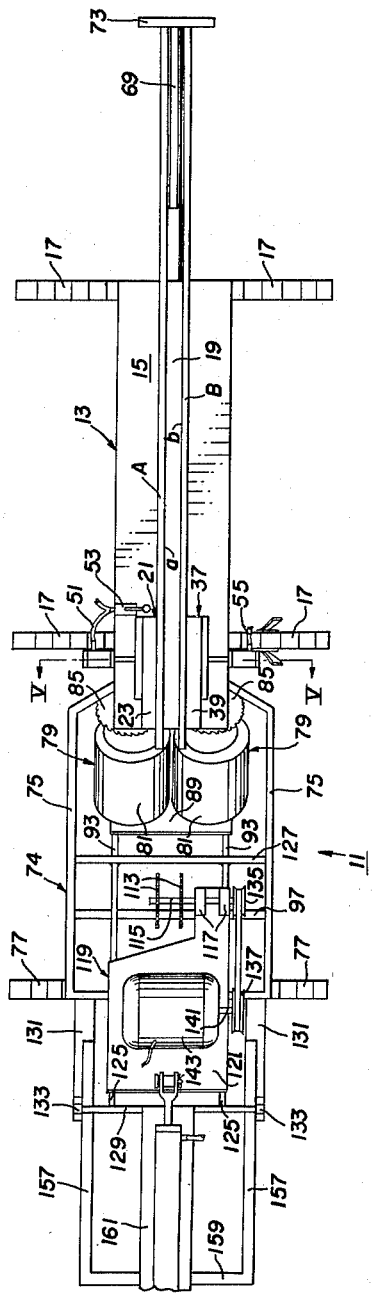
Fig. 2 is a top plan view of the same.

A conduit 51 is communicated adjacent one end thereof to the interior of cylinder 31 adjacent the outer end of the cylinder and leads to a valve 53 (Figures 8 and 9). Likewise, a conduit 55 communicates adjacent one end thereof to cylinder 47 adjacent the outer end of the cylinder and also leads to valve 53. Valve 53 is of a type well known to those skilled in the art and includes a handle 57 which is shiftable between a first position shown in Fig. 8 and a second position shown in Fig. 9. When in said first position, valve 53 functions to exhaust the air from cylinders 31, 47 through conduits 51, 55 and out through outlet port 59 to the atmosphere which permits springs 36, 50 to urge clamping shoes 21, 37 outwardly into an extended position away from rail 19, as best shown in Fig. 8. When handle 57 is disposed in said second position, valve 53 permits fluid pressure, as air pressure or the like, to be communicated to the interior of cylinders 31, 47. The source of fluid pressure is indicated diagrammatically in the drawings as at 61 and is communicated to valve 53 as by a conduit 63. This introduction of fluid pressure to cylinders 31, 47, as above described, causes the pistons 29, 45 to be respectively urged against springs 36, 50 which in turn causes the clamping shoes 21, 37 to be moved inwardly towards rail 19 to clamp the work pieces indicated as at A and B between the respective clamping shoes and the rail 19, as best shown in Figs. 2, 5, and 9. It will be understood that the work pieces A and B are placed in a reversed relationship—that is to say the corresponding flat faces $a$ and $b$ of work pieces A and B are placed against rail 19 so that when the ends of the work pieces are cut, as will be hereinafter described, they will form a right- and left-hand miter cut. In other words, the ends of the two work pieces A and B are adapted to be fitted together to form a miter joint.

The inner end 65 of feed table 13, the ends of blocks 23, 39 adjacent inner end 65, and the end of rail 19 adjacent inner end 65 are all preferably in alignment and slanted at a 45-degree angle so that the ends of the work pieces A and B can extend beyond these parts, as best seen in Fig. 1, for the cutting operations as will be more apparent in the description to follow.

At the end of table 13 opposite from inner end 65 is mounted a tube 67 in which is slidably engaged a rod 69 adapted to be secured in place by a set screw 71. Adjacent the outer end of rod 69 is fixedly mounted an upstanding stop 73 which is adapted to be engaged by the ends of workpieces A and B to give the correct length thereof.

Suitable framework 74 (Figure 2) is attached to feed table 13 for supporting the mitering and kerfing means to be described hereinafter. Framework 74 includes side frame members 75 rigidly attached adjacent one of the ends thereof to feed table 13. Frame members 75 extend substantially laterally for a portion and then away from feed table 13 in parallel spaced relationship. Framework 74 also includes a pair of legs 77 for supporting the frame members 75.

Cutting means is provided at a 45-degree angle to the upper surface 15 of feed table 13, which cutting means preferably includes a pair of rotary saws 79, each of which includes a prime mover, as an electric motor 81, rotatably driving a shaft 83 and a circular saw blade 85 fixedly attached adjacent the end of the shaft. Rotary saws 79 are fixedly mounted on a carriage 87 which preferably includes a base plate 89 having fixedly mounted on the bottom thereof in spaced parallel relationship a pair of sleeves 91 which are respectively slidably mounted on a track that preferably includes a pair of rods 93. Rods 93 are fixedly mounted adjacent the lower ends thereof on brackets 95 and are fixedly mounted adjacent the upper ends thereof on a transverse member 97 that is suspended from side frame members 75 by brackets 99.

Rotary saw blades 85 and rods 93 are disposed at a 45-degree angle relative to upper surface 15 of feed table 13, with the rotary saw blades 85 in spaced relationship from the inner end 65 of the feed table and respectively substantially in alignment with the ends of work pieces A, B that project beyond the inner end of the feed table.

Carriage 87 is shiftable, by a jack 101, between a lower position and an upper position to respectively carry the saw blades 85 between a lower or retracted position shown in Fig. 4 and an upper or cutting position shown in Fig. 3 in which the rotary saws are adapted to cut the ends of the work pieces A and B simultaneously at a 45-degree angle. Jack 101 is preferably fluid pressure operated as by air pressure or the like and preferably includes a jack cylinder 103 fixedly mounted adjacent its lower end as at 105 and having a piston 107 (Figure 1) slidably mounted therein and connected to a piston rod 109 adjacent one end with the piston rod being fixedly attached adjacent the opposite end to carriage 87 as by an upstanding stud 111 and a coupling pin 112.

It will be understood that a single rotary saw disposed centrally of carriage 87 may be used in place of the pair of rotary saws 79, without departing from the spirit and scope of the present invention.

A pair of vertically disposed and horizontally spaced parallel kerfing saw blades 113 are respectively fixedly mounted on a drive shaft 115 which is rotatably mounted in a pair of bearings 117 supported by a carriage 119 (Figure 2), which carriage preferably includes a base plate 121 having a pair of spaced sleeves 123 fixedly mounted on the bottom thereof which are respectively slidably engaged on a track that preferably includes a pair of rods 125. Rods 125 are fixedly attached adjacent one end from a cross piece 127 that extends between side frame members 75 and the rods slope upwardly therefrom to a transverse member 129 which supports the ends of the rods. Transverse member 129 in turn is supported from frame members 131 having upstanding portions 133.

Power means is provided for rotatably driving kerfing saw blades 113 and preferably includes a pulley 135 fixedly mounted on the end of drive shaft 115 and coupled to another pulley 137 by a drive belt 139. Pulley 137 is fixedly mounted on the shaft 141 of a prime mover, as electric motor 143, which in turn is fixedly mounted on carriage 119.

A jack 145 is provided for shifting carriage 119 to carry the kerfing saw blades 113 between a retracted or disengaged position shown in Fig. 3 and a cutting position shown in Fig. 4 in which the kerfing saw blades are in engagement with the ends of work pieces A and B. The kerfing saw blades 113 are respectively in alignment with the work pieces A and B so that notches will be made therein, which notches are perpendicular to the mitered end of the work pieces.

Jack 145 preferably includes a jack cylinder 147 having a piston 149 (Figure 1) slidably mounted therein and to which is attached a rod 151 that extends outwardly past the end wall of the jack cylinder where it is fixedly attached to carriage 119 by suitable means which preferably includes an upstanding stud 153 mounted on carriage 119 and a coupling pin 155.

Suitable means is provided for supporting jack 145 and preferably includes a pair of side members 157 fixedly supported from frame members 131 and extending outwardly therefrom, a cross piece 159 fixedly extending across the outer ends of side members 157, and a base 161 mounted on cross piece 159 adjacent one end thereof and mounted on transverse member 129 adjacent the other end thereof.

The fluid system for providing and controlling the introduction of fluid into and out of jacks 101, 145 is described as follows:

A conduit 163 leads from a source of fluid pressure, as air pressure or the like, which is illustrated diagrammatically in Figs. 3 and 4 as at 165. Conduit 163 is provided with branches 167, 169. Branch 167 leads to a knee actuated valve 171 which has a conduit 173 leading therefrom to the inner end of jack cylinder 103 and another conduit 175 leading from the valve to the outer end of jack cylinder 103.

Branch 169 leads to a knee actuated valve 177 which has a conduit 179 leading therefrom to the inner end of jack cylinder 147 and another conduit 181 leading to the outer end of jack cylinder 147.

Valves 171, 177 are respectively provided with levers 183, 185 and the valves are mounted in such a position that levers 183, 185 are laterally spaced and adjacent one another and in a position so that the valves may be actuated by an operator's knee pushing against levers 183, 185. Thus, valves 171, 177 are preferably mounted on one of the legs 17 adjacent the inner end 65 of feed table 13 as shown in Figure 1. The mounting of valves 171, 177 is by suitable means as clamping plates 187 (Figure 6) disposed on the opposite sides of leg 17 and held thereon as by bolts 189.

Valves 171, 177 are of a familiar type known to those skilled in the art and the following general description of valve 171 will suffice for both:

Valve 171 includes a valve body 191 having a plunger 193 extending outwardly of the valve body and urged into an outward position by means of a spring 195. Lever 183 is pivotally mounted about a substantially vertical axis as at 197 from an arm 199 projecting from valve body 191. Lever 183 is provided with a projection 201 which engages the outer end of plunger 193 so that when the outer end of the lever is moved inwardly or counter-clockwise, as viewed in Fig. 6, the projection 201 will bear against plunger 193 to urge the plunger inwardly and permit fluid to flow from branch 167 to conduit 175 and at the same time open conduit 173 to the atmosphere, whereupon jack 101 urges carriage 87 upwardly to carry rotary saws 79 into cutting engagement with the end of work pieces A, B, as previously described. Upon release of lever 183, the spring 195 urges plunger 193 outwardly and causes the fluid to be introduced from branch 167 to conduit 173 and at the same time exhaust conduit 175 to the atmosphere, thereby retracting jack 101 and lowering carriage 87 to bring the rotary saws 79 into the downward or retracted position shown in Fig 4.

Valve 177 is upside down relative to valve 171 and consequently acts in an opposite direction—that is, when the lever is urged in a clockwise direction as viewed in Fig. 6 the valve causes fluid to be introduced from branch 169 to conduit 181 while opening conduit 179 to the atmosphere, which causes jack 145 to urge carriage 119 to the right to the position shown in Fig. 4 wherein the kerfing saw blades 113 are shifted into cutting engagement with the work pieces A, B. When the lever 185 is released, the valve 177 acts in the same manner as heretofore described for valve 171 and causes the fluid from branch 169 to be introduced to the conduit 179 and at the same time exhausts the fluid in conduit 181 to the atmosphere, thereby retracting carriage 119 and kerfing saw blades 113 to the position shown in Fig. 3.

From the foregoing it will be understood that a single operator may operate the machine 11 to attain a high production rate. Thus, with shoes 21, 37 being in the open position, the operator, standing by feed table 13, places a pair of work pieces A, B on the feed table in the position heretofore described and moves lever 57 to clamp the work pieces between the shoes and rail 19. Then, with his knee he first pushes against lever 183 and then lever 185, and as a result thereof the work pieces are both mitered and kerfed and ready for removal from the machine by moving handle 57.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A machine for simultaneously forming a right- and a left-hand miter on two pieces of wood and then simultaneously splining the pieces, said machine comprising a horizontal feed table having an inner end, an elongated rail mounted on said table in the middle thereof and extending longitudinally thereof, a first clamping shoe disposed on one side of said rail in spaced parallel relationship, a second clamping shoe disposed on the opposite side of said rail in spaced parallel relationship, a pair of jack means mounted on opposite sides of said feed table for shifting said shoes towards and away from one another, a source of fluid pressure, conduit means leading from said source of fluid pressure to said jack means, valve means interposed in said conduit means for permitting fluid to be communicated to said jack means to shift said shoes towards one another whereby said shoes are adapted to clamp a pair of similar pieces of wood on either side of said rail with the like sides of said pieces against said rail and with the ends of said pieces extending beyond said end of said feed table, a first track disposed at an angle relative to said feed table, a carrier shiftably mounted on said track, power driven rotary saw means mounted on said carrier, a first jack coupled to said carrier for shifting said carrier upwardly on said track to carry said rotary saw means upwardly into sawing engagement with said pair of pieces of wood for sawing the ends thereof off at a 45-degree angle, a second track opposite said end of said feed table and spaced therefrom, a second carrier shiftably mounted on said second track, a pair of power driven and vertically disposed kerfing saw blades mounted on said second carrier, a second jack coupled to said second carrier for shifting said second carrier towards said end of said feed table to carry said kerfing saw blades respectively into sawing engagement with said wood pieces for splining the ends of said wood pieces, a fluid system means coupled to said first and second jacks for successively introducing fluid under pressure thereinto to successively shift said first and second carriers, said fluid system means including a pair of valves for controlling the flow of fluid to said jacks, each of said valves including an operating lever, said valves being mounted from said table with the levers thereof being disposed in side-by-side relationship in a position for actuation by an operator's knee whereby said machine is adapted to be knee actuated by a single operator having his hands free for loading and unloading the machine.

2. A machine for simultaneously forming a right- and left-hand miter on two pieces of wood and then simultaneously splining the pieces, said machine comprising a horizontal feed table having an inner end, an elongated rail mounted on said table and extending longitudinally thereof, a first clamping shoe disposed on one side of said rail in spaced parallel relationship, a second clamping shoe disposed on the opposite side of said rail in spaced parallel relationship, means for shifting said shoes towards said rail for respectively clamping a pair of similar pieces of wood on either side of said rail with the like sides of said pieces against said rail and with the ends of said pieces extending beyond said end of said feed table, a first track disposed at an angle relative to said feed table, a carrier shiftably mounted on said track, power driven rotary saw means mounted on said carrier, a first power means for shifting said carrier upwardly on said track to carry said rotary saw means upwardly into sawing engagement with said pair of pieces of wood for sawing the ends thereof off at a 45-degree angle, a second track opposite said end of said feed table and spaced therefrom, a second carrier shiftably mounted on said second track, a pair of power driven and vertically disposed kerfing saw blades mounted on said second carrier, a second power means for shifting said second carrier towards said end of said feed table to carry said kerfing saw blades respectively into sawing engagement with said wood pieces for splining the ends of said wood pieces, knee actuated valve means controlling said first and second power means and being arranged so that said power driven rotary saw and said kerfing saws are adapted to be successively actuated first to simultaneously miter the ends of said pieces and then to simultaneously spline the ends of said pieces.

3. A machine for simultaneously forming a right- and left-hand miter on two pieces of wood and then simultaneously splining the pieces, said machine comprising a horizontal feed table having an inner end, an elongated rail mounted on said table and extending longitudinally thereof, a first clamping shoe disposed on one side of said rail in spaced parallel relationship, a second clamping shoe disposed on the opposite side of said rail in spaced parallel relationship, means for shifting said shoes towards said rail for respectively clamping a pair of similar pieces of wood on either side of said rail with the like sides of said pieces against said rail and with the ends of said pieces extending beyond said end of said feed table, a first track disposed at an angle relative to said feed table, a carrier shiftably mounted on said track, power driven rotary saw means mounted on said carrier, a first power means for shifting said carrier upwardly on said track to carry said rotary saw means upwardly into sawing engagement with said pair of pieces of wood for sawing the ends thereof off at a 45-degree angle, a second track opposite said end of said feed table and spaced therefrom, a second carrier shiftably mounted on said second track, a pair of power driven and vertically disposed kerfing saw blades mounted on said second carrier, and a second power means for shifting said second carrier towards said end of said feed table to carry said kerfing saw blades respectively into sawing engagement with said wood pieces for splining the ends of said wood pieces.

4. A machine for simultaneously forming a right- and left-hand miter on two pieces of wood and then simultaneously splining the pieces, said machine comprising a horizontal feed table having an inner end, means for holding a pair of similar pieces of wood on said feed table in side-by-side reversed relationship with the ends of said pieces extending beyond said end of said feed table, a first track disposed at an angle relative to said feed table, a carrier shiftably mounted on said track, power driven rotary saw means mounted on said carrier, a first power means for shifting said carrier upwardly on said track to carry said rotary saw means upwardly into sawing engagement with said pair of pieces of wood for sawing the ends thereof off at a 45-degree angle, a second track opposite said end of said feed table and spaced therefrom, a second carrier shiftably mounted on said second track, a pair of power driven and vertically disposed kerfing saw blades mounted on said second carrier, a second power means for shifting said second carrier towards said end of said feed table to carry said kerfing saw blades respectively into sawing engagement with said wood pieces for splining the ends of said wood pieces, knee actuated valve means controlling said first and second power means and being arranged so that said power driven rotary saw and said kerfing saws are adapted to be successively actuated first to simultaneously miter the ends of said pieces and then to simultaneously spline the ends of said pieces.

5. A machine for simultaneously forming a right- and left-hand miter on two pieces of wood and then simultaneously splining the pieces, said machine comprising a horizontal feed table having an inner end, means for holding a pair of similar pieces of wood on said feed table in side-by-side reversed relationship with the ends of said pieces extending beyond said end of said feed table, a first track disposed at an angle relative to said feed table, a carrier shiftably mounted on said track, power driven rotary saw means mounted on said carrier, a first power means for shifting said carrier upwardly on said track to carry said rotary saw means upwardly into sawing engagement with said pair of pieces of wood for sawing the ends thereof off at a 45-degree angle, a second track opposite said end of said feed table and spaced therefrom, a second carrier shiftably mounted on said second track, a pair of power driven and vertically disposed kerfing saw blades mounted on said second carrier, and a second power means for shifting said second carrier towards said end of said feed table to carry said kerfing saw blades respectively into sawing engagement with said wood pieces for splining the ends of said wood pieces.

References Cited in the file of this patent

UNITED STATES PATENTS

| | | |
|---|---|---|
| 1,700,683 | Madsen | Jan. 29, 1929 |
| 2,171,541 | Crouch | Sept. 5, 1939 |
| 2,454,114 | Albree | Nov. 16, 1948 |
| 2,455,097 | Scianna | Nov. 30, 1948 |
| 2,856,973 | Horton | Oct. 21, 1958 |

FOREIGN PATENTS

| | | |
|---|---|---|
| 517,979 | Germany | Feb. 12, 1931 |